Figure 6:
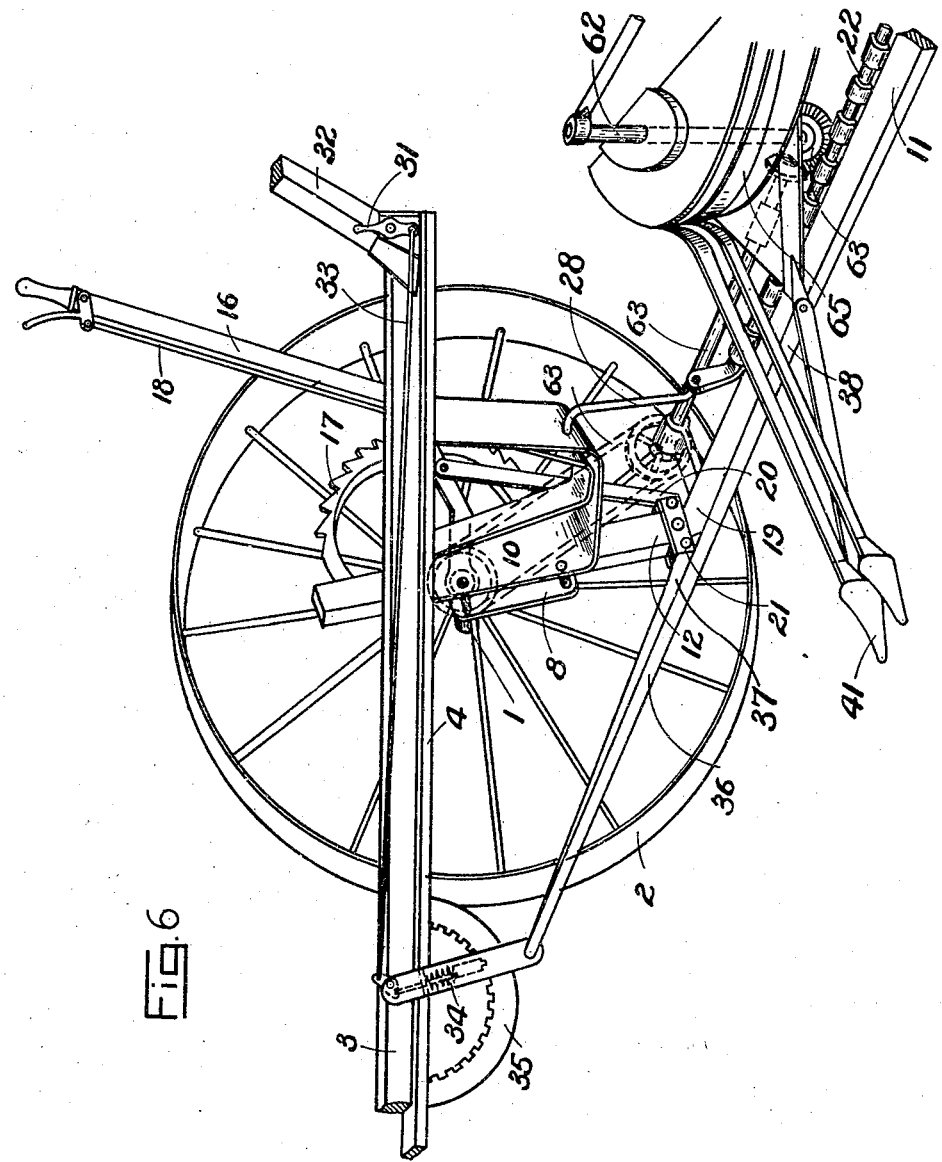

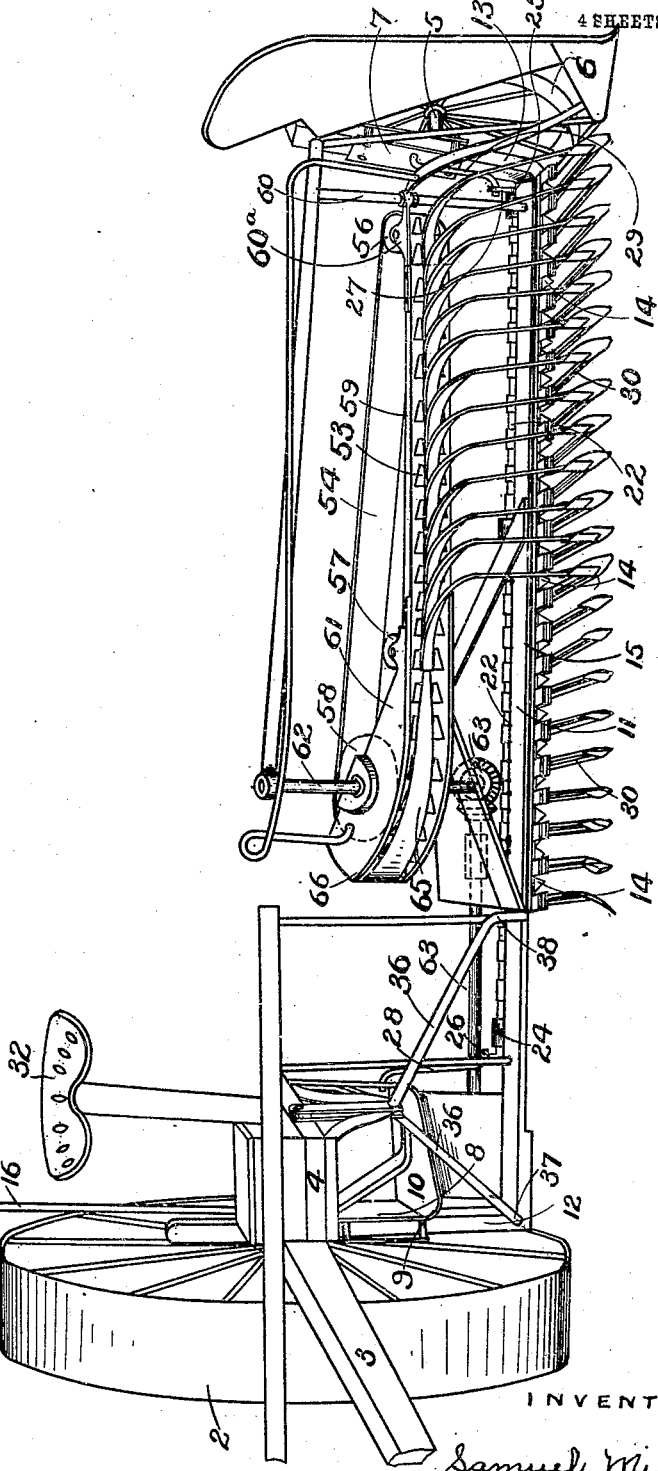

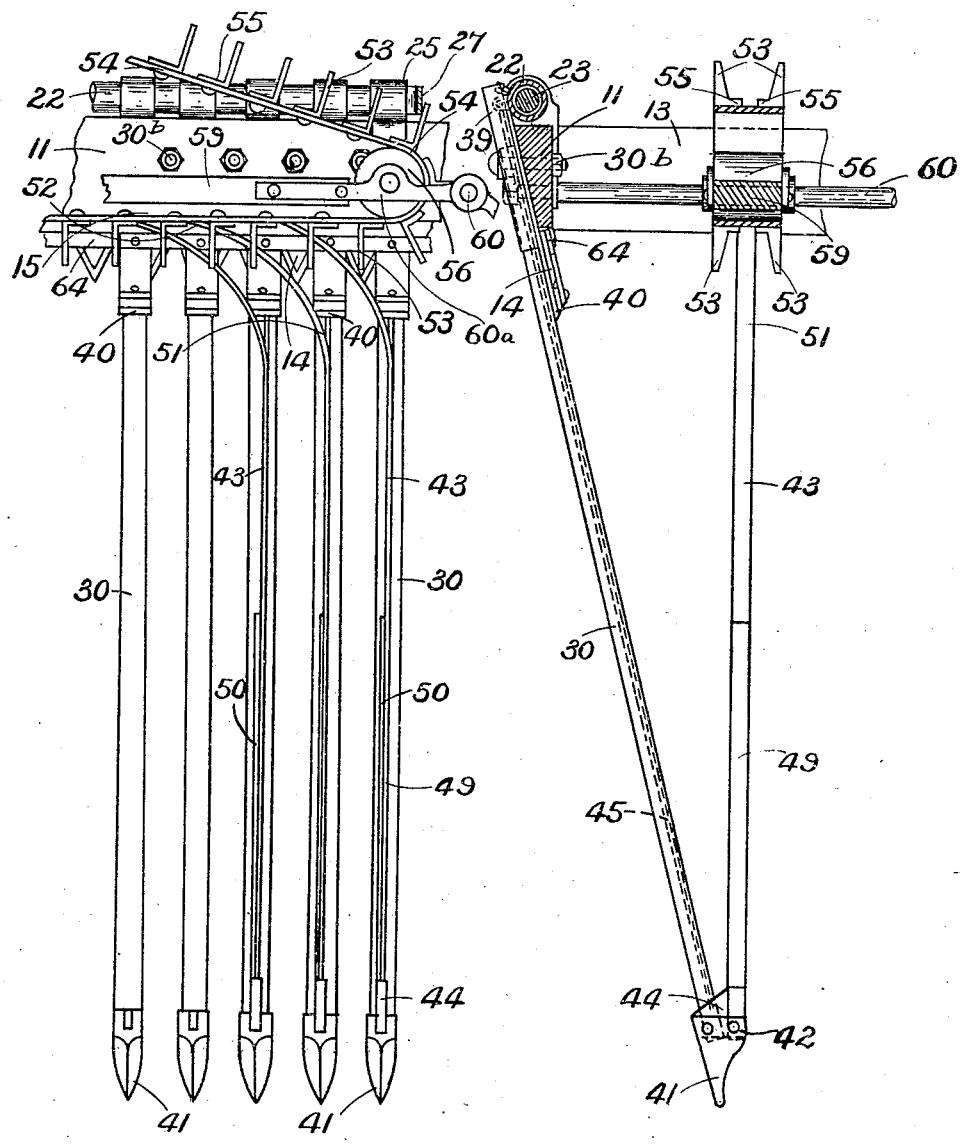

S. MILLAR.
HARVESTER.
APPLICATION FILED MAY 16, 1907.
956,127.
Patented Apr. 26, 1910.
4 SHEETS—SHEET 3.
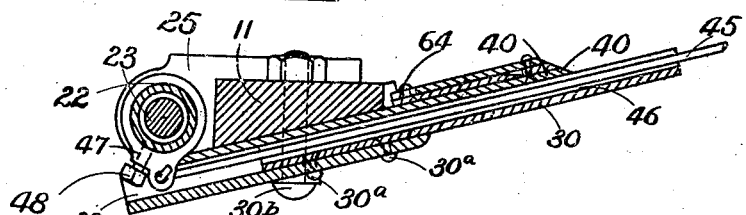
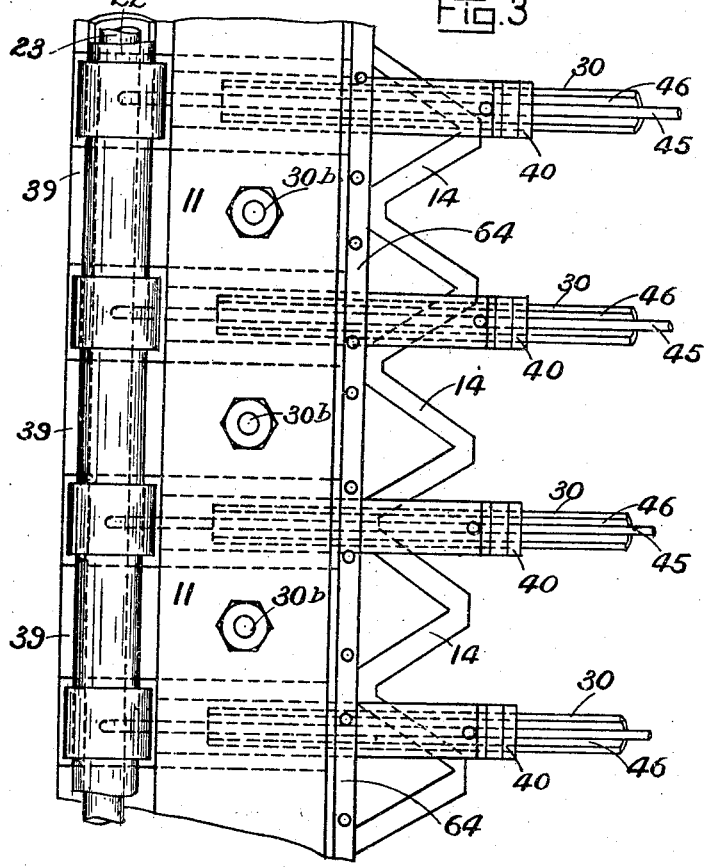
WITNESSES
W. P. Burke
John A. Percival
INVENTOR
Samuel Millar.
By
Atty

S. MILLAR.
HARVESTER.
APPLICATION FILED MAY 16, 1907.

956,127.

Patented Apr. 26, 1910.

4 SHEETS—SHEET 4.

WITNESSES
W. P. Burke
John G. Percival

INVENTOR
Samuel Millar.
By
Att'y

UNITED STATES PATENT OFFICE.

SAMUEL MILLAR, OF DUNEDIN, NEW ZEALAND.

HARVESTER.

956,127. Specification of Letters Patent. Patented Apr. 26, 1910.

Application filed May 16, 1907. Serial No. 373,917.

*To all whom it may concern:*

Be it known that I, SAMUEL MILLAR, subject of Great Britain, residing at Dunedin, New Zealand, have invented new and useful Improvements in Harvesters, of which the following is a specification.

My invention relates to harvesters for reaping and binding grain crops of the class in which the stalks of grain are conveyed and delivered in a substantially upright position to a binder receptacle, and in particular to the means for guiding the stalks in a substantially upright position to the knives of the harvester and the means for conveying in a substantially upright position the stalks when cut by the knives to the binder receptacle.

My invention is illustrated in the accompanying drawings in which similar numerals of reference indicate similar parts.

Figure 1 is a perspective view of a harvester frame from the front showing my invention thereon, some of the spring grain retainers and other parts being omitted for clearness. Figs. 2 and 3 are part plan views on an enlarged scale of my invention. Figs. 4 and 5 are sectional end views of the parts shown in Figs. 2 and 3 respectively and Fig. 6 is a perspective view showing the mechanism for lowering and raising the points of the fingers and for raising the machine.

According to my invention the axle (1) (see Fig. 6) of the driving wheel (2) is secured to and supports the pole (3) and the foot board (4) and the axle (5) see Fig. 1 of the grain wheel (6) is secured to and supports a bracket (7). Another similar bracket (8) is attached to the outer end (9) of a U shaped piece (10) which is secured to the pole (3) and the footboard (4). A horizontal finger bar (11) has two turned up ends (12) (13) which are slidable up and down within the brackets (7) (8). This finger bar (11) forms the main frame of the machine, carrying the whole of the machine that lies between the wheels. The finger bar (11) lies normally vertically below the axles (1) (5) of the wheels (2) (6) and the knife (14) which works against the front edge (15) of the finger bar (11) follows therewith the rise and fall of the wheels (2) and (6) and is thus prevented from catching in uneven ground.

The whole of the machine between and including the turned-up ends (12) and (13) of the finger bar (11) is raised or lowered vertically by means of a hand lever (16) (see Fig. 6) pivoted on the bracket (8) and provided with the usual rack (17) and spring catch (18). This lever (16) is connected to the bottom (19) of the turned up end (12) of the finger bar (11) by means of a link (20) and bracket (21). At the rear of secured to and extending behind the finger bar (11) there is a tube (22) within which lies a rod (23) (see Figs. 3 and 5) the tube being supported at its ends by bearings (24) (25) (see Fig. 1) which are mounted on the finger bar (11). The rod (23) revolves within the tube (22) and its ends project therefrom and are turned up so as to form short arms (26) (27) pivotally connected respectively to rods (28) (29) the rod (28) being hung to the U shaped piece (10) and the rod (29) being hung to the bracket (7). These rods (28) (29) and arms (26) (27) support the rod (23).

In order to raise the whole of the part of the machine which lies between the wheels the lever (16) is pushed forward thus raising the inner end of the finger bar (11) and also raising the tube (22) secured to it and the rod (23) therein. The rod (23) turns on rising and by reason of its pivotal connection with the rod (29) through the arm (27), the outer end of the finger bar is raised the same distance as the inner end.

In order to depress the points (41) of the fingers (30) to pick up grain that is beaten down or to raise the fingers, the machine can be turned on the axles (1) (5) of the wheels (2) (6) by the following mechanism. A foot piece (31) (Fig. 6) pivotally secured to the foot board near the driver's seat (32) is connected by a rod (33) to a spring catch (34) which engages a racked quadrant (35) secured to the footboard (4). This catch (34) is connected by a double stay (36) (see also Fig. 1) which has its other ends (37) (38) secured to the finger bar (11). The whole machine swings on the axles (1) (5) except the pole (3) and footboard (4) to which the catch (34) and quadrant (35) are attached. Consequently the angle of tilt of the fingers (30) is according to the position of engagement of the catch (34) in the quadrant (35). In order to depress the points (41) of the fingers (30) the catch (34) is released and held disengaged by the foot of the driver moving the foot piece (31) whereupon the machine swings backwardly by its own weight depressing the points (41) of the fingers (30) and the catch (34) is allowed to engage the quadrant (35). When it is desired to raise the points (41) of the fingers the catch (34) is held disengaged as before described, and the lever (16) is pulled back without releasing its spring catch (18) thus causing the whole machine to swing forwardly on the axles (1) (5) to the desired position, in which it is secured by releasing the catch (34).

Figs. 2, 3, 4, and 5 illustrate some of the series of fingers (30) which are curved in cross section and are secured to the finger bar (11) by means of a series of lap-jointed plates (39) which are riveted to the fingers (30) by rivets (30ª) and secured to the finger bar (11) by bolts and nuts (30ᵇ). The ledger plates (40) are secured under the finger bar (11) between the flanges on the plates (39) and the finger bar, a piece being cut out of the finger bar (11) the thickness of each ledger plate (40) to enable the latter to fit flush with the under surface of the finger bar. The fingers (30) project preferably about two feet terminating in a sharp point or sheath (41) having an upward projecting piece (42) (Fig. 4) for the purpose of pivoting the stalk retaining springs (43) thereto. The stalk retaining springs (43) are provided with downwardly projecting pieces (44) reaching close to the fingers (30) to each of which pieces (44) a rod (45) is secured. This rod (45) leads along the channel (46) (Figs. 3 and 5) formed by the curved shape of the finger (30) and is connected to a collar (47) fixed on the tube (22) by means of a set screw (48). Each spring (43) preferably consists of a piece of steel (49) (Figs. 2 and 4) folded and secured to the downward projecting piece (44) the folded portion (50) reaching to preferably about half the length of the spring. The piece of steel (49) is continued about one third farther of the length at which point a spring (51) of lighter material is suitably secured to the single part of the spring, in order to give the necessary flexibility at its end (52). The ends (52) of the springs (43) rest with pressure between the prongs (53) of the horizontal conveyer belt (54) against the face of the plates (55) secured to the conveyer belt (54), and the rods (45) connecting the outer ends of the springs (43) to the collars (47) on the tube (22) insure the loose inner ends (52) of the springs keeping in position. The conveyer belt (54) consists of a band of suitable material having secured thereto a series of plates (55) with prongs (53) secured to them or formed integral with them. These prongs (53) are for supporting and conveying the stalks of the crop. The conveyer belt (54) travels on small pulleys (56) (57) and on a driving pulley (58) the pulleys (56) (57) being suitably supported upon a frame (59) which is attached by an arm (60ª) to the standard (60) at the outer or grain wheel end, and to a bracket (61) (Fig. 1) at the inner end, the driving pulley (58) being mounted on the main vertical spindle (62). The spindle (62) which gives motion to the conveyer belt (54) is driven by any suitable driving mechanism such as by sprocket chain and bevel gearing from the driving wheel (2) and indicated at (63).

The knife (14) is similar in construction to existing knives except that the blades are secured (Fig. 5) under the back of the knife bar (64) which bears against the front edge (15) of the finger bar (11) with the object of giving an even surface in contact with the ledger plate (40).

A guide band (65) (Fig. 1) disengages the stalks from the prongs (53) on the conveyer belt (54) and has one end resting against the conveyer belt, and the other end secured to or formed integral with the end (66) of the bracket (61), the crop being delivered past this guide band (65) into any suitable binding mechanism which does not form part of this invention and is not shown.

Having now described my invention, what I claim as new and desire to secure by Letters Patent is:—

1. In harvesters, in combination with the finger bar forming the main frame thereof, a series of fingers, each terminating in a sharp pointed sheath having an upward projecting piece, grain retaining springs pivoted to said projecting pieces, means for cutting the grain crop, pulleys a horizontal conveyer belt provided with projecting prongs and mounted on said pulleys and adapted to move over the ends of the grain retaining springs, and means for operating the conveyer belt; whereby the grain crop is guided and carried in a substantially vertical position to the binding mechanism of the harvester, substantially as described.

2. In a harvester of the class described, a finger bar, a series of forwardly projecting parallel fingers secured to said finger bar, horizontal conveying means transverse to the line of draft mounted above said finger bar, and a series of stalk retaining springs secured at one end to the ends of said fingers and having curved inner ends lying against said conveying means, substantially as and for the purposes set forth.

3. In a harvester of the class described, a finger bar, a series of forwardly projecting parallel fingers secured to said finger bar, horizontal conveying means transverse to the line of draft mounted above said finger bar, and a series of stalk retaining springs pivotally secured at one end to the ends of said fingers and having curved inner ends lying against said conveying means, substantially as and for the purposes set forth.

4. In a harvester of the class described, a finger bar, a series of forwardly projecting parallel fingers secured to said finger bar a horizontal pronged conveyer belt mounted above said finger bar, and a series of stalk retaining springs secured at their forward ends to the ends of said fingers and having curved rear ends lying against said conveyer belt substantially as and for the purposes set forth.

5. In a harvester of the class described, a finger bar, a series of forwardly projecting parallel fingers secured to said finger bar, a horizontal pronged conveyer belt mounted above said finger bar and a series of stalk retaining springs pivotally secured at their forward ends to the ends of said fingers and having curved rear ends lying against said conveyer belt, substantially as and for the purposes set forth.

In testimony whereof I have signed my name to this specification in the presence of two subscribing witnesses.

SAMUEL MILLAR.

Witnesses:
   ANDREW JOHN PARK,
   JOHN RUTHERFORD PARK.